United States Patent [19]

Belanger et al.

[11] Patent Number: 5,361,443
[45] Date of Patent: Nov. 8, 1994

[54] ELASTIC COUPLING FOR A CAR WASH ROTARY WHEEL ASSEMBLY

[75] Inventors: Michael J. Belanger, Walled Lake; Robert J. Wentworth, Farmington Hills, both of Mich.

[73] Assignee: Belanger, Inc., Northville, Mich.

[21] Appl. No.: 53,715

[22] Filed: Apr. 27, 1993

[51] Int. Cl.$^5$ .............................................. B60S 3/06
[52] U.S. Cl. ..................... 15/97.3; 15/53.3; 15/DIG. 2
[58] Field of Search .......... 15/53.1, 55.2, 53.3, 15/97.3, DIG. 2

[56] References Cited

U.S. PATENT DOCUMENTS

| | | | |
|---|---|---|---|
| 3,868,740 | 3/1975 | Brovig | 15/53.2 |
| 3,881,208 | 5/1975 | Miner | 15/53.2 |
| 4,198,722 | 4/1980 | Ennis | 15/53.2 |
| 4,225,995 | 10/1980 | Ennis | 15/53.2 |
| 4,424,602 | 1/1984 | Belanger et al. | 15/53.2 |
| 4,513,467 | 4/1985 | Roneaglione | 15/53.2 |

FOREIGN PATENT DOCUMENTS 2006596 12/1969 France ............ 15/DIG. 2

Primary Examiner—Edward L. Roberts
Attorney, Agent, or Firm—Brooks & Kushman

[57] ABSTRACT

A washing apparatus is provided for washing the exterior surface of a vehicle. The apparatus is made of a frame, an arm pivotably attached to the frame and extending along the vehicle path which is provided with a support plate for suspending a generally vertical rotatable wheel having a central shaft operatively driven by a drive motor. An elastic coupling mounts the wheel and associated drive motor upon the support plate. The coupling includes a mounting plate spaced above and generally parallel to the support plate and is separated by at least one elastic member radially spaced from the wheel axis and circumferentially arranged thereabout. The mounting plate is capable of moving axially and rotating relative to the support plate to a limited range, thereby facilitating the lateral deflection of the wheel assembly in response to the engagement with the vehicle causing the wheel shaft axis to deviate a limited amount from the vertical orientation. The elastic members are radially spaced from and circumferentially arranged about the shaft axis.

15 Claims, 7 Drawing Sheets

ELASTIC COUPLING FOR A CAR WASH ROTARY WHEEL ASSEMBLY

TECHNICAL FIELD

The present invention relates to vehicle washes and more particularly to drive through vehicle washes that have generally vertical elongated cylindrical rotary wheels for washing the front sides and rear of the vehicle.

BACKGROUND ART

Drive through car washes are frequently provided with rotatable elongated cylindrical wheels or brushes for cleaning the front, sides and rear portions of the vehicle exterior. In order to wash the front and rear portion of the vehicle, rotatable wheels are frequently positioned on the distal ends of elongated arms which extend over the path of the vehicle. Upon engagement with the vehicle, the wheels must quickly move onward toward the vehicle sides in order to allow the vehicle to advance. Once the sides of the vehicle are washed, the wheels move inward to wash the rear of the vehicle as it is moving longitudinally away from the rotating wheel station. In order to effectively wash the front and rear of the vehicle, it is necessary to allow the wheel to generally move transversely so the wheel can effectively follow the contour of the vehicle.

When washing the front of the vehicle, if the wheel does not effectively move out of the vehicle path, the car wash mechanism can be damaged. If the wheel does not effectively move inboard after the side of the vehicle is washed, the rear of the vehicle will not be cleaned properly. It is therefore necessary to mount the wheel in a manner in which it is capable of limited longitudinal movement along the path of the vehicle.

There are two distinctly different design approaches to solve this longitudinal wheel movement problem. One approach is to mount the rotatable wheel assembly on a sliding carriage which translates the length of a pivotal arm and extends over the path of the vehicle. Car wash apparatus of this type is illustrated in U.S. Pat. No. 4,424,602, Belanger et al. and is incorporated by reference in its entirety. An alternative design suspends the wheel assembly from the end of a pivotal arm at a fixed location. The wheel assembly is allowed to deflect relative to the arm in response to engagement with the vehicle. Deflection is achieved by either using a flexible wheel shaft such as a plastic shaft or mounting the wheel and motor assembly on a flexible elastic doughnut-like coupling. The coupling is loaded in tension and located between the motor and the shaft. Alternatively, a universal coupling can be placed between the drive motor and wheel.

DISCLOSURE OF THE INVENTION

An object of the present invention is to provide a low maintenance, easy to service and very durable elastic coupling for attaching a generally vertical rotary wheel and motor assembly to an arm in a car wash apparatus.

Another object of the present invention is to provide an elastic coupling which has at least two pronouncedly different spring rates, a relatively firm spring rate when engaging the front and rear of the vehicle and a softer spring rate enabling the wheel to move inboard to wash the back of the vehicle in response to the wheel reaction force.

Accordingly, a washing apparatus of the present invention is provided for washing the exterior surfaces of a vehicle which passes relative thereto along a longitudinal vehicle path. The apparatus is made up of a frame which is oriented outside the path of the vehicle, an arm which pivotably attaches to the frame and is pivotable between a location above the path of the vehicle and an outward position adjacent the output edge of the vehicle as it passes thereby. A support plate is provided on the arm spaced a distance from the arm pivotal end. A generally vertical rotatable wheel assembly is provided having a central shaft of flexible outer periphery for washing the vehicle. A drive motor is operatively connected to the wheel assembly central shaft for rotating the wheel relative to the vehicle.

The wheel assembly with attached drive motor is suspended upon the support member by an elastic coupling assembly. The elastic coupling assembly allows the drive motor and the wheel assembly to move axially and rotate relative to the support plate through a limited range and to facilitate the lateral deflection of the wheel assembly in response to engagement with the vehicle enabling the wheel central shaft to deviate a limited amount from its normal vertical orientation. The elastic coupling includes a mounting member which is preferably spaced above the support member by at least three elastic members which are radially spaced from and circumferentially arranged around the wheel central shaft. The elastic members are normally loaded in compression.

Preferably, the elastic members have at least two different effective spring rates so that the resistance to lateral deflection of the wheel assembly in one direction is substantially less than the resistance to lateral deflection in another direction thereby enabling the spring rate exerted by the wheel against the vehicle's front and side surfaces to be less than the spring rate which results from the reaction force caused by the wheel engaging the vehicle rear surface.

Two embodiments of the invention are disclosed. One embodiment has the support member affixed to the free end of the arm. A second embodiment has the support member which is attached to a carriage and free to translate along the arm between the free and pivotable ends of the arm.

BRIEF DESCRIPTION OF THE DRAWINGS

FIGS. 7A–10A are a series of schematic plan view illustrations showing a car being washed by the first embodiment of the invention at various times during a wash cycle;

FIG. 7B–10B are side elevational views showing the passenger side of a car relative to the car wash apparatus at a series of different times corresponding to FIGS. 7A–10A;

BEST MODES FOR CARRYING OUT THE INVENTION

Figure 1:
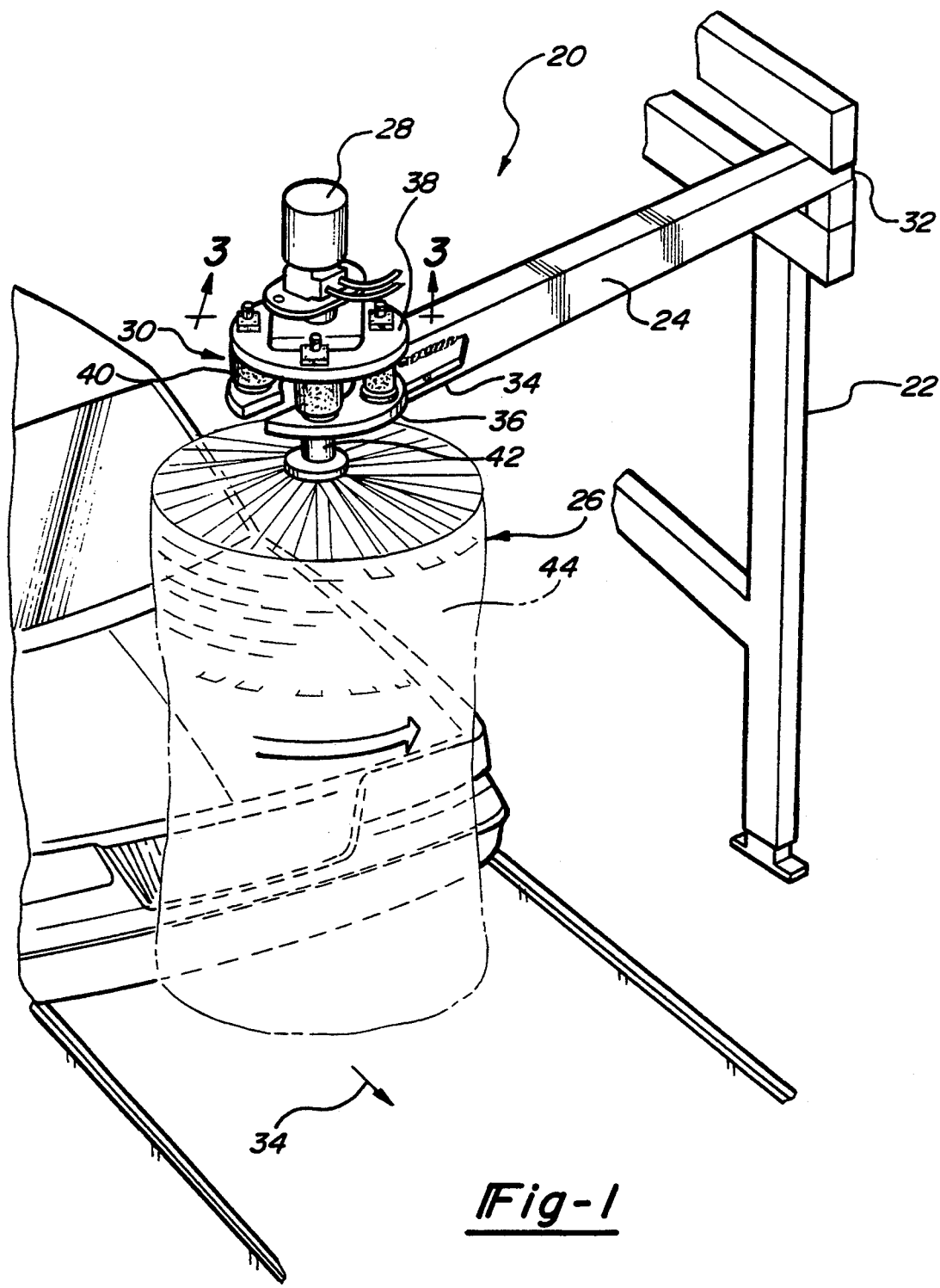
FIG. 1 is a perspective view of a first embodiment of the vehicle wash apparatus incorporating the present invention.
Figure 2:
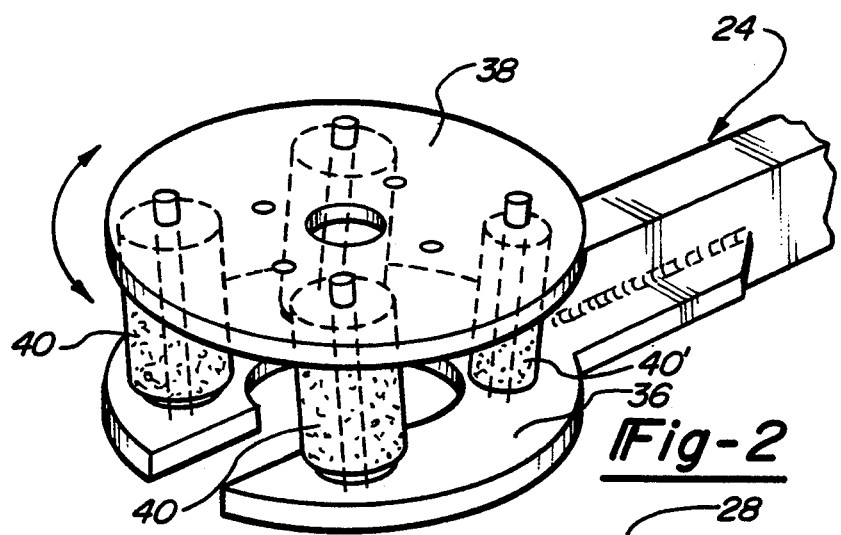
FIG. 2 is a perspective view of an elastic coupling of FIG. 1.

Referring to FIGS. 1–10, the first embodiment of car wash apparatus 20 is illustrated. Car wash apparatus 20 is made up of a frame 22, an arm 24 and a rotatable wheel 26. Hydraulic drive motor 28 operatively drives the wheel 26. Elastic coupling assembly 30 freely suspends the drive motor and attached wheel assembly upon the free end of arm 24 as illustrated.

As the vehicle moves forward along the longitudinal path in the direction of arrow 34, a front surface of the vehicle will engage rotating wheel assembly 26. The wheel assembly illustrated is the left or driver's side wheel since it will wash the driver's side of the vehicle. An apparatus of a similar design will wash the passenger's side of the vehicle. Preferably, the driver's side wheel will rotate counterclockwise and the passenger's side wheel will rotate clockwise.

As the vehicle strikes the wheel assembly, the entire wheel assembly 26 and attached drive motor will deflect slightly relative to the arm causing the wheel axis to deviate slightly from its normal vertical orientation. This relative movement is controlled by the elastic coupling 30 which enables the wheel assembly and motor to move relative to the arm both axially vertically and in rotation as well as facilitating the lateral deflection of the wheel as the elastic coupling 30 resiliently deflects.

Frame 22 is affixed to the floor outside of the path of the vehicle to be washed. Arm 24 has a pivotal end 32 which is pivotably connected to the frame 22 and a free end 34 which is spaced opposite the pivotal end. Arm free end 34 is shiftable between an inboard position as illustrated in FIG. 1 where the frame free end is above the passing vehicle and an outboard position adjacent to and outboard the edge of the passing vehicle. A support member is formed by is affixed to the arm free end 34 and defines the generally planar surface. Elastic coupling assembly 30 cooperates with support plate 36. Coupling assembly 30 is made up of a mounting member formed by plate 38 which is spaced above and generally parallel to support plate 36. Interposed between the mounting plate and the support plate are a series of elastic members 40. In the preferred embodiment illustrated, four elastic members 40 are spaced radially outboard from the wheel shaft central axis and arranged circumferentially about the shaft axis every 90°. Similar results can be achieved with a greater number and as few as 3 cylindrical elastic members. The elastic members are loaded in compression between the mounting plate and the support plate, thereby bearing the entire weight of the wheel assembly 26, the drive motor 28, and the mounting plate 38. Wheel assembly 26 is made up of a generally vertical rotatable central shaft 42 and a flexible vehicle engaging wheel 44 which is preferably made up of a series of non-woven cloth strips as is conventional and widely utilized in the car wash industry.

While the embodiment of the invention illustrated utilizes a hydraulic motor 28, other conventional drive mechanisms such as a pneumatic motor or an electric motor, could be utilized as well. Additionally, the drive mechanism need not be affixed coaxially directly to the end of the shaft, but rather it can be oriented radially as in the case of angle gear drive or parallel and offset as in the case of a chain or a belt drive. In instances where the drive motor is not mounted coaxially on the end of the shaft as illustrated in the preferred embodiments, the drive motor can be affixed to the arm and therefore not suspended by the elastic coupling 30.

Figure 3:
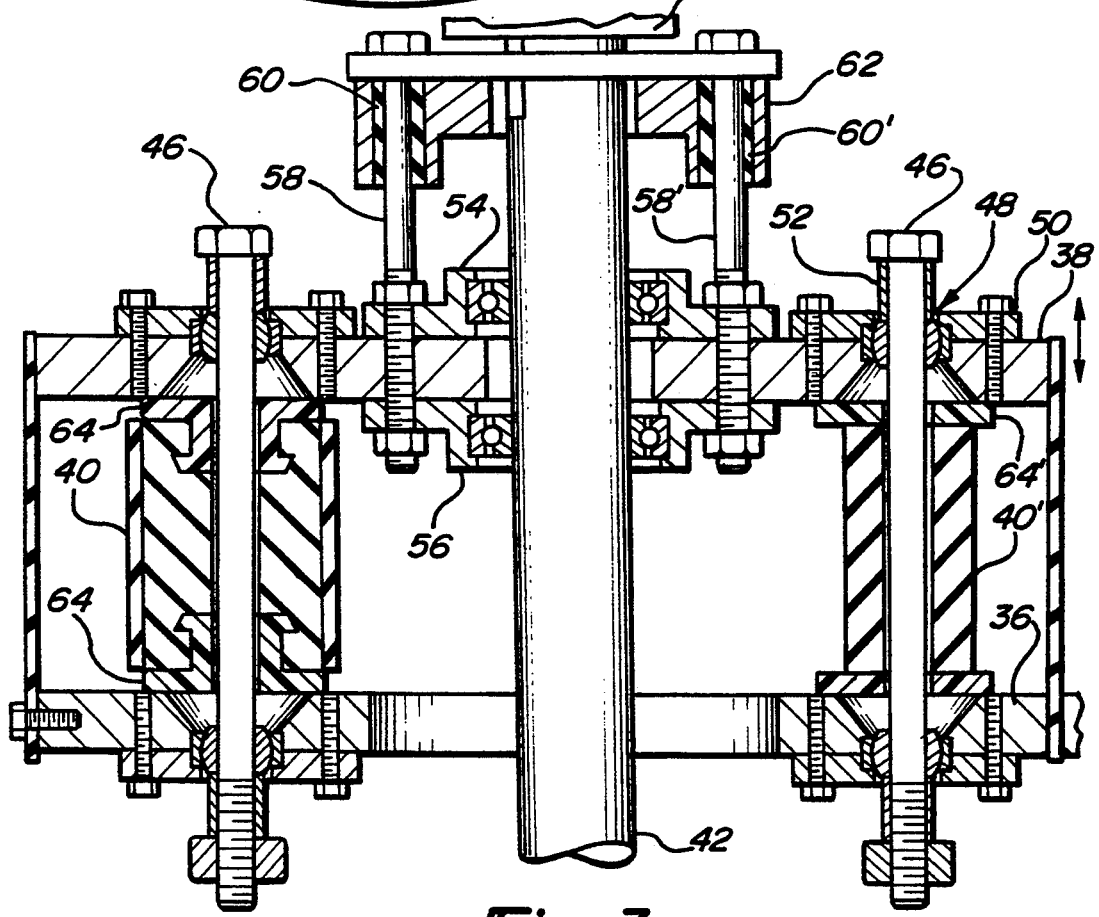
FIG. 3 is a cross-sectional side elevational view taken along line 3—3 of FIG. 1.
Figure 4:
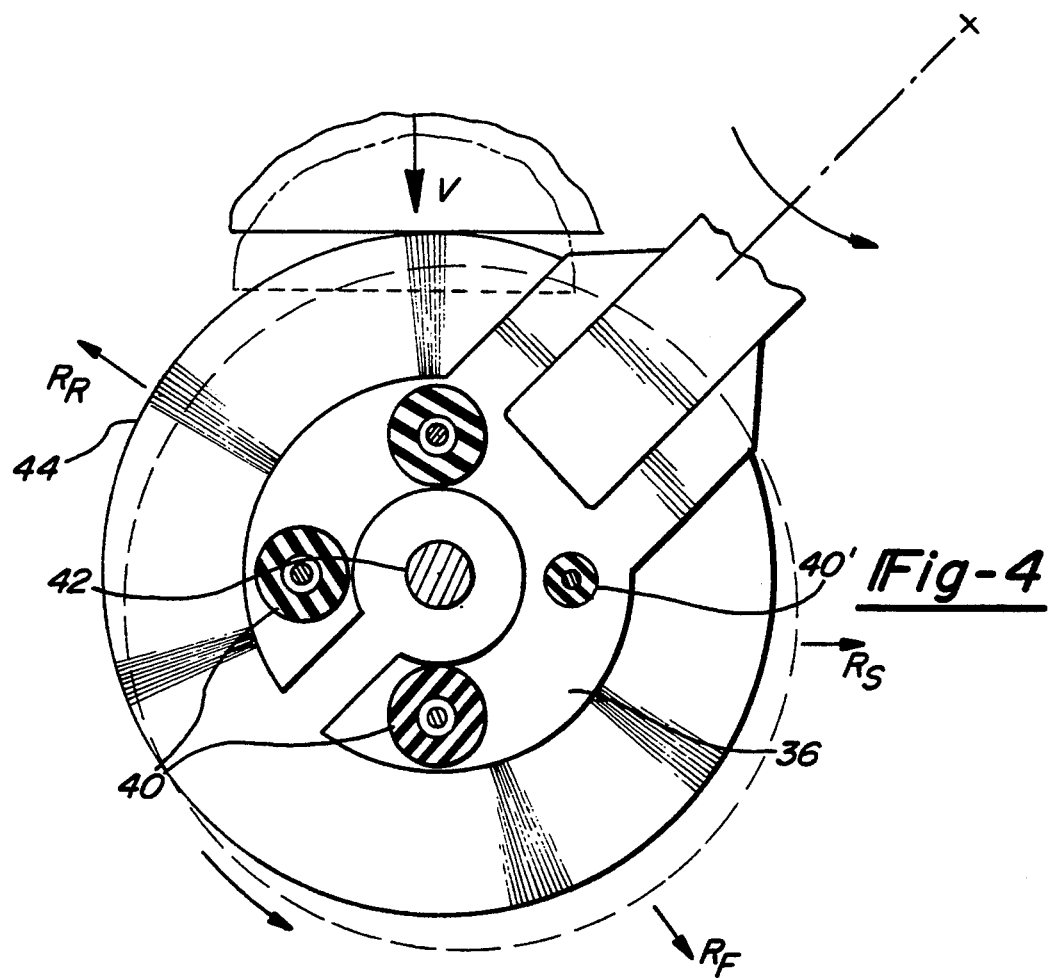
FIG. 4 is a cross-sectional plan view taken along line 4—4 of FIG. 3.
Figure 5:
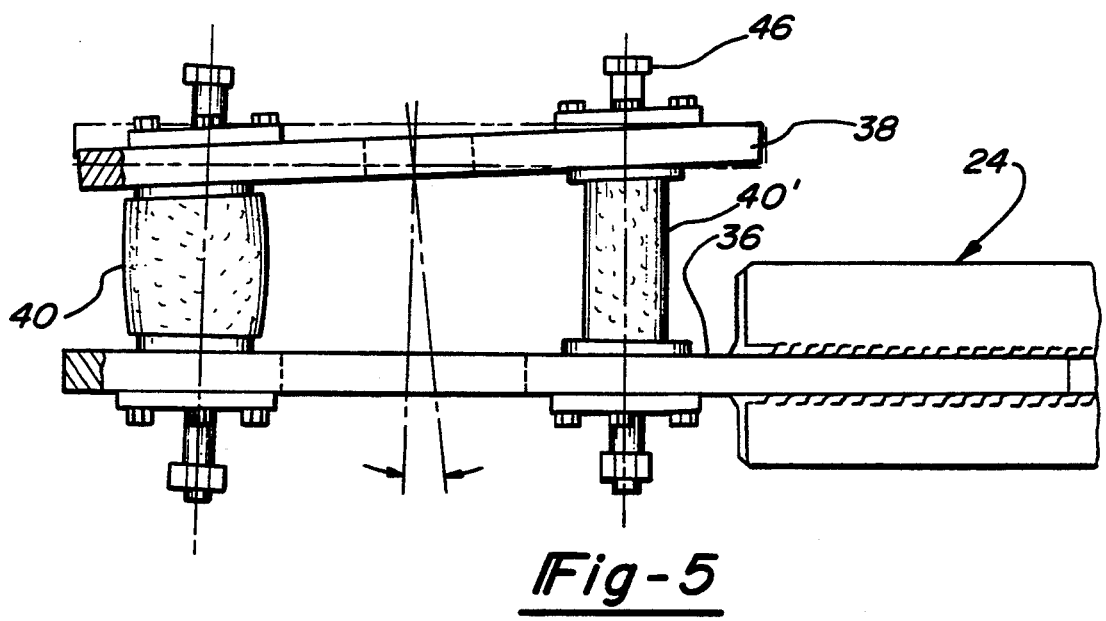
FIG. 5 is a side elevational view illustrating relative movement between the mounting plate and the support plate.

The details of the construction of the elastic coupling and its relative orientation to support plate 36, central shaft 42 and drive motor 28 are best seen in FIGS. 2–5. As indicated by the arrows in FIG. 2, mounting plate 38 can rotate relative to support plate 36 causing the elastic members 40 to deflect. The mounting plate can also elastically move or vibrate vertically along the shaft axis as indicated by the double ended arrow in FIG. 3 as the elastic members are simultaneously compressed in unison. When a load is exerted against a wheel by any vehicle, the elastic members will be compressed a varying amount depending upon relative position with respect to the load thereby facilitating the lateral deflection of the wheel assembly enabling the shaft to deviate a limited amount from the vertical orientation as illustrated in FIG. 5. In normal operation, the maximum deviation experienced will be on the order of approximately 10°.

As illustrated in FIGS. 2–6, the elastic members 40 are not all the same size. One of the elastic members 40′ has a smaller diameter and a much lower spring rate than the other three. By properly orienting the elastic members relative to the vehicle, the amount of deflection from vertical of the wheel can be controlled in order to effectively wash the rear of the vehicle. A particularly difficult problem in a vehicle wash using a wrap-around type wheel for washing the back of the vehicle, is the difficulty in washing the back centermost portion of the vehicle. Since the arm pivot end is most typically located outboard of the vehicle path, as the arm pivots inward, the end of the arm moves slightly away from the vehicle. In order to maximize the wheel travel across the rear of the vehicle, the elastomeric coupling ideally will become soft in the region to allow inward movement.

The load exerted by the vehicle against the wheel is a combination of the static of the load which is provided by the arm urging the wheel against the vehicle and a reaction force caused by the rotating engagement of the wheel outer periphery and the vehicle surface. The resultant force is greatest when the wheel initially strikes the front of the vehicle and is relatively lower against the side of the vehicle and unfortunately very low when washing the rear of the vehicle. The present coupling is designed to maximize the travel of the wheel across the rear of the vehicle so that the center rear portion of the vehicle can be effectively cleaned without sacrificing force.

The detailed construction of the elastic coupling in its orientation relative to support plate 36 and drive motor 28 is best illustrated in FIG. 3. Mounting plate 38 is suspended above a support plate 36 in general parallel spaced apart orientation. Sandwiched between mounting plate 38 and support plate 36 are elastic members, two of which, 40 and 40′, are visible in the FIG. 3 cross-sectional view. Elastic members 40 and 40′ are preloaded in compression by bolts 46 which serve as elongated tensile members. Bolts 46 extend through holes drilled in the mounting plate 38 and support plate 36 extending coaxially through the central bore formed in elastic members 40 and 40' in order to facilitate the relative rotation of the mounting plate 38 about the shaft axis relative to support plate 36. Spherical bearings 48 are mounted to the support plate 36 and the mounting plate 38 at each of the intersections formed between each of the four bolts and each of the mounting plates. These spherical bearings enable the bolts to axially slide through the plates as well as pivot relative to the plate through a range of approximately 90°. Since the bolts initially preload elastic members 40 and 40', rotation of the mounting plate relative to the support plate causes the two plates to move axially together. The elastic members are loaded in compression and shear during relative rotation of the support and mounting plates. This combination of a support plate, mounting plate and elastic members interconnected by tensile members spherical bearings act as a torsional pendulum.

Spherical bearings 48 are retained by bearing retainer plates 50 as illustrated in FIG. 3. Bolts 46 have sleeves 52 inserted thereon so that the bolt head and bolt nut will be spaced sufficiently from the mounting and support plates so as not to impede torsional movement.

Shaft 42 is pivotably mounted upon mounting plate 38 by upper and lower bearings 54 and 56 which maintain the shaft perpendicular to mounting plate 38 at all times. Ideally, bearings 54 and 56 also secure shaft 42 axially to mounting plate 38 so that the weight of the wheel and axial loads exerted on the wheel are not transmitted to the drive motor 28. In the preferred embodiment illustrated, a pair of bolts 58 and 58' serve to securely mount the upper and lower and bearing assemblies to mounting plate 38 as well as serving to rotationally affix drive motor 28 to mounting plate 38. Bolts 50 and 50' extend upwardly above upper bearing assembly 54 extending through a pair of elastic bushings 60 and 60' oriented in motor torque plate 62. Motor 28 is securely bolted to motor torque plate 62 and the output member from the motor 28 is operatively connected directly to wheel shaft 42 in a conventional manner. Torque plate 62 enables drive motor 28 to rotate wheel shaft 42 without exposing the motor to axial or bending loads which would severely limit its useful life. The present design also makes it very simple for the car wash owner to remove and replace the drive motor with minimal disruption of the car wash business.

Elastic members 40 are readily commercially available from the Firestone Tire and Rubber Co. of Akron, Ohio, and are commonly referred to by the trademark Marshmallow Spring ®. The construction of these elastic springs are described in detail in U.S. Pat. No. 3,892,398, which is incorporated by reference herein.

As illustrated in FIG. 3, the larger diameter elastic member 40 is provided with a fiber reinforced outer sleeve which controls the elastomeric spring rate when loaded in compression. Preferably, end caps 64 and 64' are installed on the axial ends of elastic members 40 and 40' as shown. The end caps let the elastomeric members rotate relative to the support plate 36 and mounting plate 38, thereby extending the life the elastic members.

In order to enclose the elastic coupling, preferably a rubber curtain 65 will be attached to and extend between support plate 36 and mounting plate 38. Curtain 35 gives the device a more clean aesthetic appearance and prevents dirt and debris from accumulating between the support and mounting plates. This curtain is only shown in FIG. 3 as it would otherwise obscure the structural details of the apparatus. It is not intended to significantly vary the elastic characteristics of the coupling.

The affect of the different spring rates of elastic members 40 and 40' is best illustrated with reference to FIGS. 4 and 5. At different times during the wash cycle, due to the location of the vehicle relative to the wheel and the orientation of the arm 24 relative to the vehicle, the load exerted on the elastic members will vary dramatically. FIG. 4 illustrates a top by weight plan view of the driver's side vehicle wash apparatus in the inboard-most position as the vehicle V initially engages the rotary wheel 44. As the vehicle advances, the force exerted on the wheel by the vehicle will cause elastic coupling 30 to flex, moving the wheel to the position illustrated in dotted outline. The initial movement of the vehicle also causes the wheel to deflect slightly forming a flat spot. Note that the wheel is not offset directly opposite the normal force exerted by the vehicle. The resultant force exerted on the wheel is a combination of the normal force and the reaction force caused by the friction between the wheel surface and the vehicle. The sum of the forces exerted on the wheel by engaging the front of the car are illustrated by the resultant force vector $R_f$.

When the rear of the car is being washed, the sum of the forces exerted on the wheel will be generally opposite a direction as illustrated by vector $R_f$. When the side of the car is washed, the sum of the forces exerted on the wheel will be in the direction of resultant force vector $R_s$ with respect to the coupling in its present orientation.

As can be seen in FIG. 5, when the wheel is engaging the side of the vehicle, the reaction force $R_s$ causes mounting plate 38 to deflect relative to support plate 38 into a non-parallel orientation. Elastic member 40 compresses as illustrated. The bolt 46 associated with elastic member 40' is loaded in tension while the bolt associated with elastic member 40 is slack. Elastic member 40' is not loaded in compression beyond its initial preload.

Figure 6:
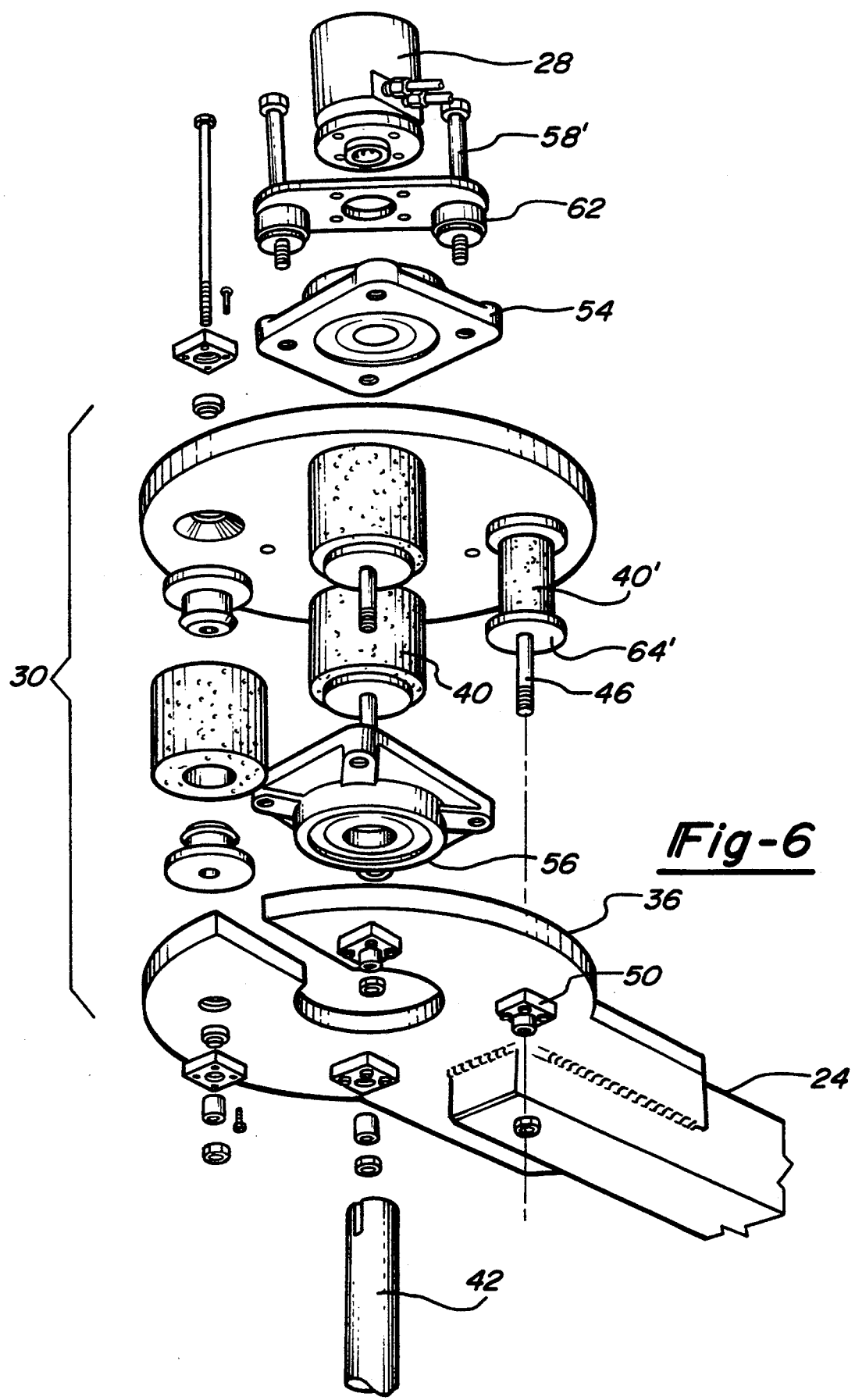
FIG. 6 is an exploded partial perspective view of the first embodiment of the invention.

Specific details of the elastic coupling 30 and its association with wheel shaft 42 and the drive motor 28 are further shown in the FIG. 6 exploded perspective view. The support plate 36 has a central keyhole-shaped hole 66 formed therein for receiving the shaft. Keyhole-shaped opening 66 allows the shaft to be radially installed upon the support plate with the elastic coupling 30 in the drive motor affixed to the shaft. This design enables the wheel assembly, the drive motor and the mounting plate to be pre-assembled and hung upon the end of arm 24 to facilitate simple maintenance and installation.

Figure 7A:
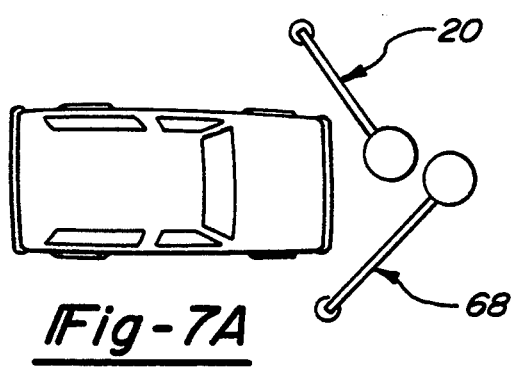
Figure 7B:
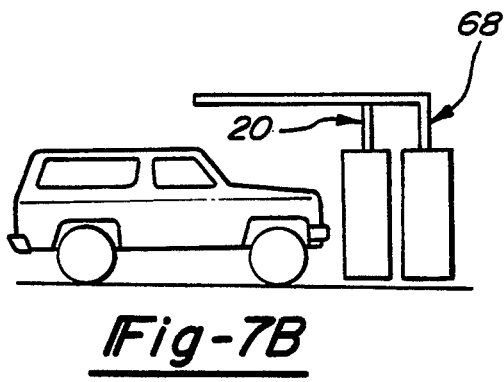

The orientation of wash apparatus 20 relative to the vehicle in a car wash is depicted in a series of different longitudinal positions in plan view in FIGS. 7A–10A and corresponding side elevations 7B–10B. In FIGS. 7A and 7B, the vehicle is shown approaching the driver's side wash apparatus 20 and the passenger side wash apparatus 68. Each wash apparatus has a pivotal arm having a rotary wheel assembly located at its free end. The rotary wheels are originally in the inboard position adjacent the path of the vehicle with the wheel axes are generally vertical. As the vehicle advances, the front of the vehicle initially engages the wash apparatus 20. The wheel will quickly wash the driver's side front portion of the vehicle as the arm traverses outwardly rounding the front corner to the position shown in FIG. 8. Continued advancement of the vehicle causes the front of the vehicle to next engage the passenger side wheel.

Figure 8A:
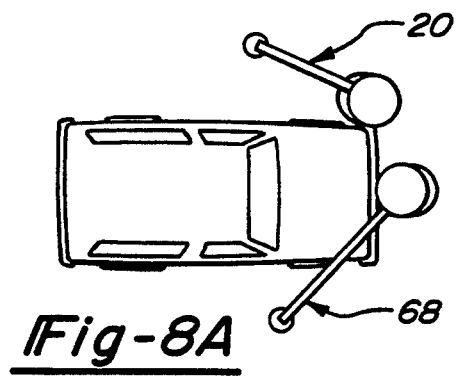
Figure 8B:
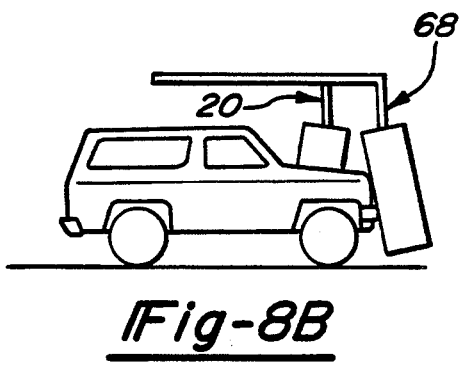

As indicated in FIG. 8B, when washing the sides of the vehicle, the axes of the wheels of wash apparatus 20 and 68 deviate slightly from vertical to the reaction force caused by the engagement of the wheel on the vehicle side surface. The lowermost portion of the wheel to be inclined rearward of the uppermost portion. Wheel of wash apparatus 68, on the other hand, is inclined in the opposite direction due to the force exerted on the wheel by the front of the vehicle.

Figure 9A:
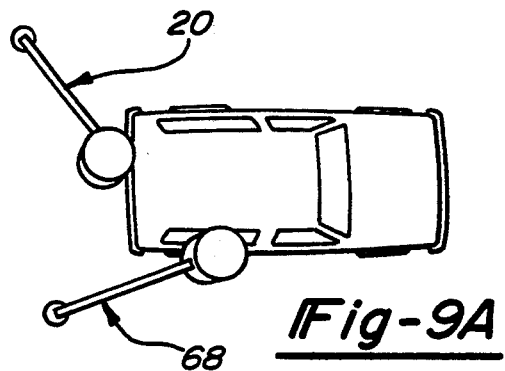
Figure 10A:
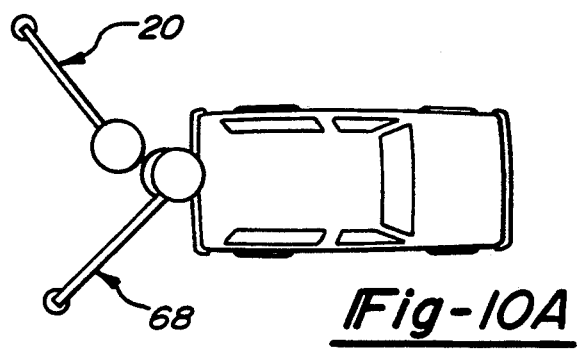
Figure 9B:
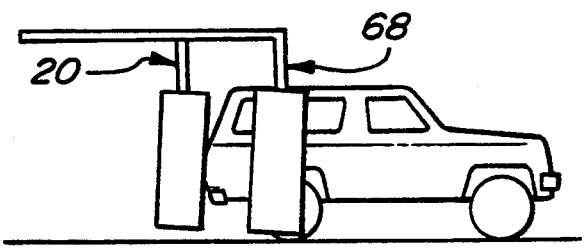
Figure 10B:
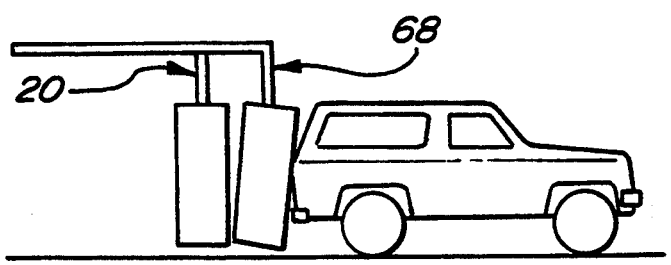

As the vehicle continues to advance, as shown in FIG. 9A, the wheel of wash apparatus 20 rounds the driver's side rear corner of the vehicle to wash the driver's side rear portion of the vehicle as illustrated. Ideally, when the wheel of wash apparatus 20 rounds the rear corner, the wheel is inclined significantly as illustrated in FIG. 9B to enable the wheel to maintain engagement with the vehicle as long as possible as the vehicle advances away from the wash apparatus. As the vehicle continues to advance, the wheel of wash apparatus 20 loses contact with the vehicle as shown in FIG. 10A and the wheel of wash apparatus 68 rounds the passenger side rear corner of the vehicle to wash the remainder of the vehicle rear portion. Once again, significant inboard inclination of the wheel after rounding the rear corner is desirable in order to maintain wheel-to-vehicle engagement as long as possible to ensure the center rearmost portion of the vehicle is effectively washed.

An advantage of the present invention is that the elastic members 40 and 40' can be varied to suit the specific car wash application to optimize the cleaning efficiency for the particular wheel diameter and arm length selected.

Figure 11:
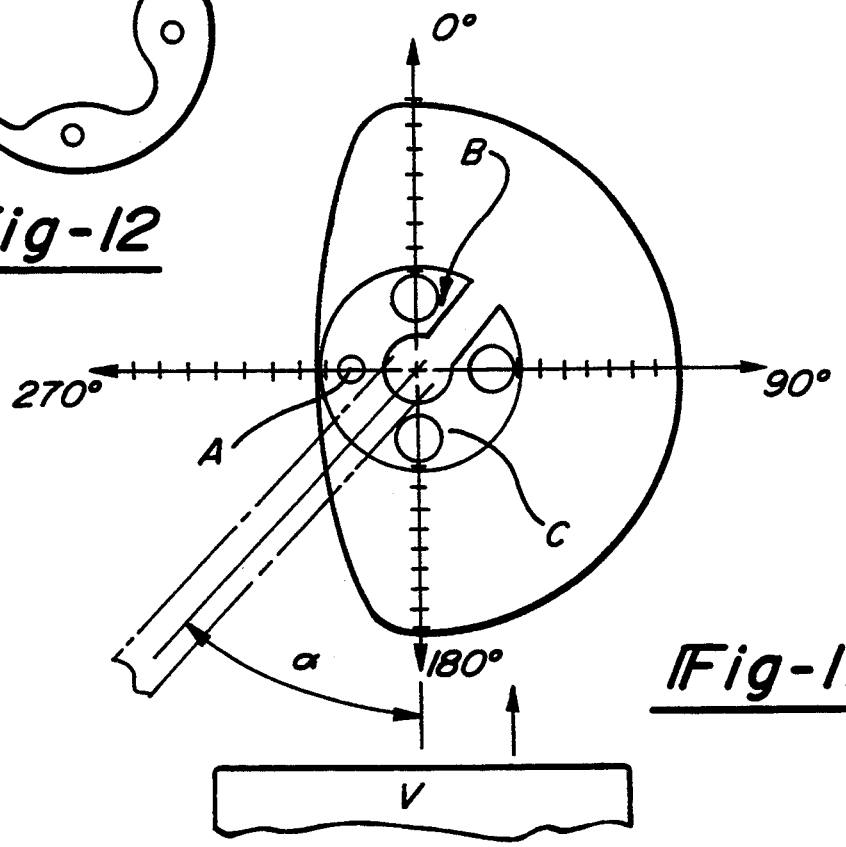
FIG. 11 is a polar diagram of the spring rate of the elastic coupling.

By selecting various elastic members, as well as varying the number of members and their relative radial and circumferential spacing, a wide variety of non-uniform spring rates can be achieved. FIG. 11 illustrates in a polar diagram the reaction of force resulting from a given displacement input. The reaction force is equal at the 0° and 180° polar coordinates indicating that for a given forward or rearward movement of the wheel the reaction force on the vehicle will be of similar magnitude. It should also be appreciated that since the spring rate is substantially constant between 0° and 180°, a spring rate of the wheel as it engages a side of the vehicle will be similar to that when it engages the front and rear of the vehicle. The spring rate at the 270° polar coordinate, however, is significantly lower than the spring rate in the 0° to 180° range enabling the wheel to freely move inward toward the center of the vehicle as after the wheel rounds the outside rear corner. This low spring rate enables the wheel to travel a greater distance across the rear of the vehicle in order to concentrate cleaning the center rear portion of the vehicle which is traditionally the most troublesome to clean.

It should also be appreciated that more than 3 elastic members can be used and the invention is not limited to the specific embodiment illustrated. Alternatively, the 3 large diameter elastic members 40 could be replaced by 2 large elastic members at positions B and C and somewhat similar performance characteristics could be provided a relatively soft elastic member 40' was maintained in its current position A. A present design enables the elastomeric coupling to be adapted by installing various size elastic members to accommodate the varying needs of the particular car wash application.

Figure 12:
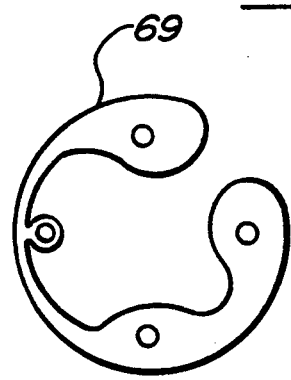
FIG. 12 is a top plan view of an alternating unitary elastic member.

It should also be appreciated that rather than using commercially available cylindrical elastic members, a single custom elastic member, such as member 69 shown in FIG. 12, can be fabricated to achieve the desired elastic coupling performance. The single elastic member 69 will exhibit a performance similar to that illustrated in the polar diagram of FIG. 11 replacing the 4 elastic members 40 and 40' with a single molded unit.

Figure 13:
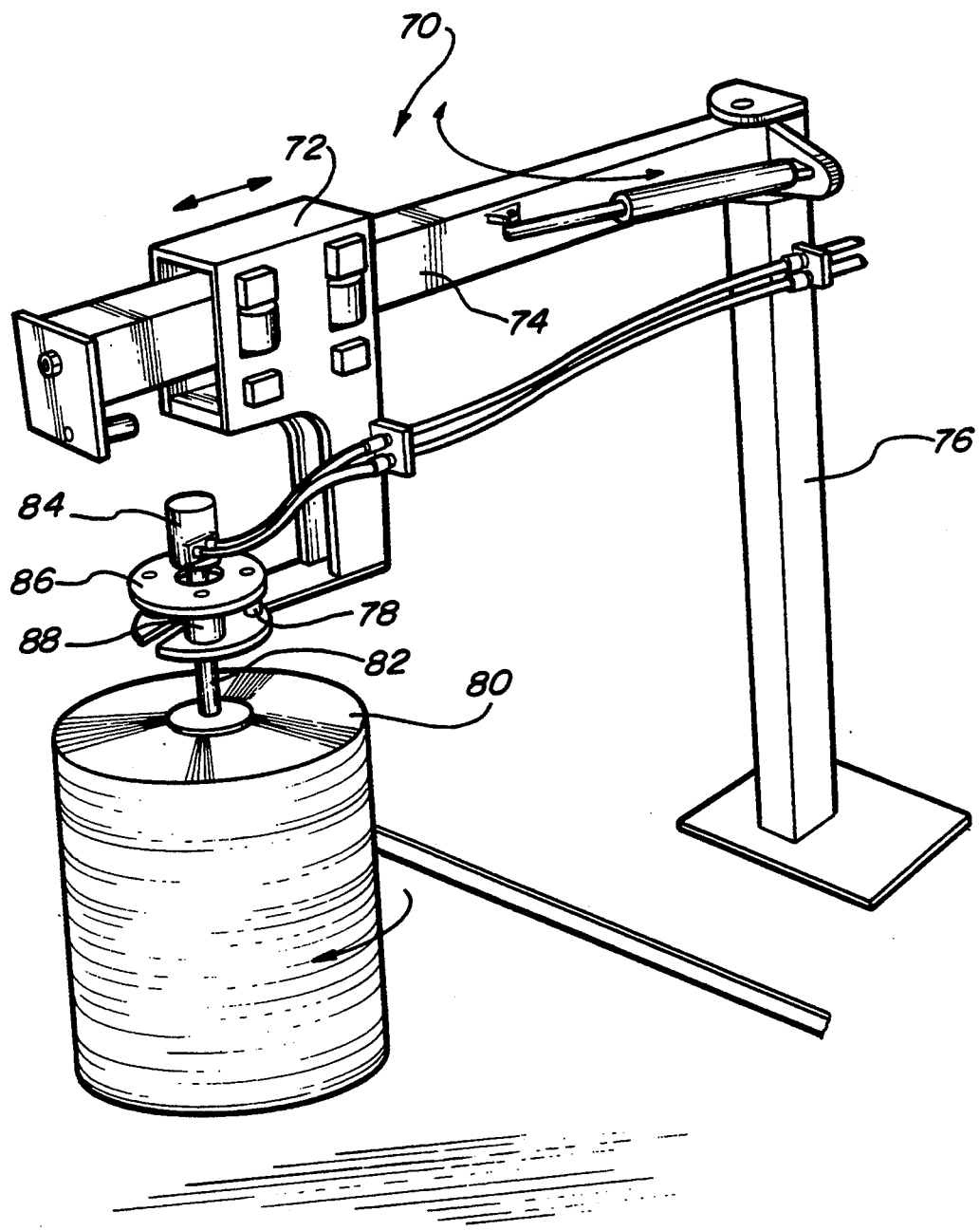
FIG. 13 is a perspective view of a second embodiment of the invention.

An alternative embodiment of the present invention is shown in FIG. 13. Car wash apparatus 70 employs many of the identical features of the first embodiment of the invention. However, rather than fixing the wheel on the fixed end of an arm, the entire wheel assembly, drive motor and elastic coupling are mounted on a translating carriage 72 which moves along the length of the pivotable arm 74. Arm 74 is pivotably mounted to frame member 76. The structure of the frame, the arm and the carriage is described in detail in U.S. Pat. No. 4,424,672 to Belanger et al, entitled "Car Washing Apparatus", which is incorporated by reference in its entirety for the purpose of describing in detail the arm frame and carriage structure and associated drive mechanisms. The above-referenced patent describes a free standing washer frequently referred to in the trade as a wrap-around washer. In addition, the present invention can be attached to a integral wash station frame as shown in U.S. Pat. No. 5,177,825, entitled Compact Drive-Through Vehicle Wash, which is also incorporated by reference for the purpose to show an example of an equally preferred structure for utilizing the present invention. When using a wash apparatus with a wheel mounted on a translating carriage as opposed to being fixed on the distal end of the arm, it is much easier to ensure that the rear of the vehicle is completely washed since the engagement of the wheel and the vehicle can be maintained as the carriage follows the vehicle.

The elastic coupling serves two very important functions. First, it isolates the arm and carriage from vibratory loads resulting from normal operation of the wheel during the cleaning cycle. Second, it prevents damage to the arm, carriage and wheel shaft in the event a driver of a vehicle in the car wash accidentally drives into the wheel at an excessive speed. The elastic coupling thereby greatly minimizing the likelihood of damage and down time of the wash apparatus.

Wash apparatus 70 is provided with a support plate 78 which is affixed to the lowermost end of carriage 72. As described with reference to the previous embodiment, wheel 80 has a central shaft 82 which is driven by drive motor 84. Drive motor 84 is mounted upon the end of the shaft and the shaft and the motor assembly is affixed to mounting plate 86. Mounting plate 86 is spaced above and suspended upon support plate 78 by a series of four elastic members 88. As previously described, support plate 78 has a keyhole-shaped opening formed therein so that the wheel assembly drive motor and mounting plate can be removed as a complete assembly.

While the best modes for carrying out the invention have been described in detail, those familiar with the art to which this invention relates will recognize various alternative designs and embodiments for practicing the invention as defined by the following claims.

What is claimed is:

1. An apparatus for washing the generally vertical exterior surfaces of a vehicle passing relative thereto along a longitudinal path, the apparatus comprising:

a frame oriented outside of the path of the vehicle to be washed;

an arm having a pivotal end attached to the frame and an opposed free end spaced therefrom said free and shiftable between an inboard position above the path of the vehicle and an outboard position adjacent to the outboard edge of the vehicle;

a support member cooperating with said arm and positioned at a location spaced from the pivotable end;

a generally vertical rotatable wheel assembly having a central shaft and a flexible outer periphery for washing the exterior surfaces of a vehicle;

a drive mechanism operably connected to the wheel assembly central shaft for rotating the wheel assembly about a central axis; and an elastic coupling assembly for freely suspending the drive motor and attached wheel assembly from the frame, said elastic coupling assembly including a mounting member spaced above the support member by at least one elastic member radially spaced from and circumferentially arranged about the central shaft, said at least one elastic member being loaded in compression between the mounting and support members enabling the wheel assembly and mounting member to move relative to the supporting member through a limited range, facilitating deflection of the wheel assembly in response to engagement with the vehicle enabling the shaft to deviate a limited amount from a vertical orientation.

2. The apparatus of claim 1 wherein said at least one elastic member in cooperation with the support and maintaining members provide at least two different effective spring rates when the wheel assembly is loaded in different directions, so that the resistance to lateral deflection of the wheel assembly in one direction is substantially less than the resistance to lateral deflection in another direction thereby enabling the force exerted by the wheel against the vehicle's front and side surfaces to be different than the force which results from the wheel engaging the vehicle's rear surface.

3. The apparatus of claim 2 wherein said at least one elastic member provides at least twice the resistance to lateral deflection when the wheel assembly is engaging the vehicle's front and in side surfaces than when engaging the vehicle's rear surface.

4. The apparatus of claim 2 wherein said at least one elastic member comprises a single unitary generally C-shaped member.

5. The apparatus of claim 1 further comprising a plurality of tensile members extending between the mounting and support members for limiting relative movement.

6. The apparatus of claim 5 wherein said at least one elastic member is preloaded in compression by said tensile members.

7. The apparatus of claim 6 wherein said at least one elastic member comprises a plurality of generally cylindrical rubber-like cushions having a central aperture formed therein where said tensile members extending through the elastic member central apertures.

8. The apparatus of claim 7 further comprising a plurality of rigid plastic end caps interposed between the elastic members and the mounting and support members.

9. The apparatus of claim 5 further comprising a plurality of tensile member bearings cooperating with each of the tensile members at the intersection between the tensile member and the support member and the mounting plate to allow the tensile members to pivot with respect to the plates and to shift axially with respect to at least one of said plates.

10. The apparatus of claim 1 wherein said support member is a generally planar plate and has formed therein a generally C-shape opening sized to removably receive the central wheel shaft therethrough enabling the wheel assembly to be installed thereon as a preassembled unit.

11. The apparatus of claim 1 wherein the support member is affixed to the arm free end.

12. The apparatus of claim 11 wherein said support member is a generally planar plate and has formed therein a generally C-shape opening sized to removably receive the central wheel shaft therethrough enabling the wheel assembly with the drive mechanism directly connected thereto to be installed thereon as a preassembled unit.

13. The apparatus of claim 1 wherein said support member slidably cooperates with the arm and is shiftable between an extended position adjacent the arm free end and a retracted position intermediate the arm free and pivotal ends.

14. The apparatus of claim 13 wherein said support member is a generally planar plate and has formed therein a generally C-shape opening sized to removably receive the central wheel shaft therethrough enabling the wheel assembly with the drive mechanism directly connected thereto to be installed thereon as a preassembled unit.

15. An apparatus for washing the generally vertical exterior surfaces of a vehicle passing relative thereto along a longitudinal path, the apparatus comprising:

a frame oriented outside of the path of the vehicle to be washed;

a pair of arms attached to the frame on opposite sides of the vehicle longitudinal path, each of said arms having a pivotal end;

a pair of support plates each respectively cooperating with one of said arms and positioned at a location spaced from the arm pivotable end;

a pair of generally vertical rotatable wheel assemblies each having a central shaft and a flexible outer periphery for washing opposite exterior surfaces of a vehicle;

a pair of drive motors each cooperating with one of said wheel assembly central shafts; and a pair of elastic coupling assemblies, each cooperating with one of said support plates for freely suspending the drive motor and attached wheel assembly from the frame, each of said elastic coupling assemblies including a mounting plate to which the drive motor is attached, said mounting plate spaced above the support plate by at least three elastic members which are radially spaced from and circumferentially arranged about the central shaft, said elastic members being loaded in compression thereby allowing the mounting plate to move relative to the support plate to enable the wheel assembly, drive motor and mounting plate to move axially and to rotate relative to the mounting plate through a limited range, thereby facilitating the lateral deflection of the wheel assembly in response to engagement with the vehicle enabling the wheel control shaft to deviate a limited amount from a vertical orientation.

* * * * *